United States Patent
Zopf et al.

[11] Patent Number: 5,942,180
[45] Date of Patent: Aug. 24, 1999

[54] METHOD AND APPARATUS FOR HEATING FIBER REINFORCED THERMOPLASTICS BY MEANS OF CONTACT HEATING MEANS

[75] Inventors: Ernst Zopf, St. Georgen; Wolfram Stadlbauer; Wilfried Blauhut, both of Linz; Manfred Lehner, Pasching; Wolfgang Penz, Unterweitersdorf, all of Austria

[73] Assignee: Borealis AG, Austria

[21] Appl. No.: 08/905,969

[22] Filed: Aug. 5, 1997

[30] Foreign Application Priority Data

Aug. 7, 1996 [AT] Austria ................................ 1424/96

[51] Int. Cl.⁶ ............................ B29B 13/02; B29B 11/16; B29C 70/50
[52] U.S. Cl. ........................ 264/324; 264/257; 425/371; 425/446
[58] Field of Search ...................... 425/370, 371, 425/112, 383, 397, 446, 403.1; 264/319, 324

[56] References Cited

U.S. PATENT DOCUMENTS

| | | | |
|---|---|---|---|
| 5,085,812 | 2/1992 | Ahrweiler et al. | 425/371 |
| 5,149,394 | 9/1992 | Held | 425/371 |
| 5,433,905 | 7/1995 | Tisch . | |
| 5,876,534 | 3/1999 | Erhardt | 264/258 |

FOREIGN PATENT DOCUMENTS

| | | |
|---|---|---|
| 0 170 953 | 2/1986 | European Pat. Off. . |
| 2215628 | 10/1973 | Germany . |
| 44 15 610 | 5/1994 | Germany . |
| 62-116117 | 5/1987 | Japan ................................ 425/371 |
| 418 626 | 8/1966 | Switzerland . |
| 2019313 | 10/1979 | United Kingdom . |

OTHER PUBLICATIONS

*Patent Abstracts of Japan*, vol. 95, No. 4 (abstract of JP 07–016936) (May 1995) (AN–95–093480).
*Patent Abstracts of Japan*, vol. 15, No. 260 (abstract of JP 03–086506 (Jul. 1991) (AN–91–152125).
M. Ostgathe et al., *TR Technische Rundschau Transfer*, vol. 87, No. 45, pp. 26–28 (Nov. 1995).
J. Dyckhoff et al., *Kunststoff Journal*, pp. 16–22 (May 1992).

*Primary Examiner*—Mathieu D. Vargot
*Attorney, Agent, or Firm*—Wenderoth, Lind & Ponack, L.L.P.

[57] ABSTRACT

A method and apparatus for heating fiber reinforced thermoplastics in sheet form in contact heating means, in which the thermoplastic is heated between bands in the space between two heating means which can be pressed against it and is at the same time held between an upper and a lower sheet-like or filament-shaped restraining means, which is respectively arranged between the thermoplastic and the band. After heating up, the thermoplastic is taken out of the heating zone together with the restraining means and bands, the bands firstly being detached from the thermoplastic, while the restraining means continue to bear against the thermoplastic, and subsequently the restraining means are detached from the thermoplastic.

10 Claims, 1 Drawing Sheet

METHOD AND APPARATUS FOR HEATING FIBER REINFORCED THERMOPLASTICS BY MEANS OF CONTACT HEATING MEANS

BACKGROUND OF THE INVENTION

The invention relates to a method for heating fiber reinforced thermoplastics in contact heating means and also to an apparatus for carrying out the method.

Fiber reinforced, for example glass mat reinforced thermoplastics, as semi-finished products are usually in the form of sheets. To process them by pressing, these sheets have to be heated to a temperature which is usually about 60–80 degrees above the melting point of the thermoplastics. According to the prior art, this is usually accomplished in infrared ovens or hot air ovens, i.e. the heat is transferred either by radiation or by forced convection.

A disadvantage of heating by radiation is local overheating of fibers detaching themselves from the compact surface and of matrix adhering to them. Since the radiation source is usually several 100 degrees hotter than the fiber reinforced thermoplastic to be heated and since the removal of heat from a fluffy structure in the direction of its base is poor, the tips of the fibers become very hot before the entire sheet has heated through. In this case, the adhering thermoplastic is damaged, under some circumstances even vaporizes, which is disadvantageous for the quality of the parts to be pressed. Contact of the hot parts with the ambient air also contributes to the damage by oxidation.

When heating is carried out in circulating air ovens, the problem of local overheating is greatly reduced, but by the same token the supply of oxygen is increased and, in particular in the case of small parts, there arises the problem that they are "blown" by over-intensive air flow, which, in the interests of a troublefree production sequence, must be avoided under all circumstances by limiting the air speed, but consequently also the heat transfer. Since, moreover, for the purpose of avoiding thermal damage to the product (the thermoplastic), the air temperature is also limited to a value not much higher than the thermoplastic temperature to be reached, generally long heating-up times of the order of 10 to 15 minutes are required. In the case of continuous production, this means that the circulating air oven must be large enough for a plurality of blanks to fit in it at the same time for heating up.

Both methods share the disadvantage of poor thermal efficiency, i.e. the ratio of energy supplied to energy actually taken up by the fiber reinforced thermoplastic is unsatisfactory.

To avoid these problems, it has also been attempted to transfer the required heat to the fiber reinforced thermoplastics by heat conduction. This is achieved by bringing the fiber reinforced thermoplastic to be heated between 2 heating plates, of which at least one is movably arranged and which are pressed together for heating. Problematical in this case is the removal of the heated fiber reinforced thermoplastic from such an apparatus, since it adheres intensively to the heating surfaces. To solve this problem of adhesion, in the case of contact heating ovens it was attempted not to bring the thermoplastic directly into contact with the heating plates, but between 2 bands which are as thin as possible and conduct heat as well as possible. In the case of industrial-scale configurations, these are designed as circulating bands. In this case as well, the thermoplastic can be detached from the bands only with great difficulty. These bands consist, for example, of a glass fabric, which is coated or impregnated with silicones or fluoropolymers, such as for example polytetrafluoroethylene (PTFE). They may also consist of metallic materials, for example steel.

To detach the heated thermoplastic from the bands, it is proposed by J. Dykhoff and W. Michaeli (Kunststoff-Journal 5-92, pages 16–22) to quench the bands. The superficially solidified thermoplastic can then actually be detached from the bands. The disadvantage of this method in terms of energy is obvious: an amount of heat equivalent to that which is removed from the thermoplastic during quenching must subsequently be additionally supplied to the thermoplastic again, or be stored as an elevated temperature, for example it has to be supplied to the thermoplastic again after quenching by an additional heating means, for example a radiation heating means. In this case, there are further major disadvantages in addition to the high energy losses. During quenching, the heat must be removed uniformly and rapidly over the entire surface area of the thermoplastic in order to ensure uniform flowing behavior of the fiber reinforced thermoplastic. However, rapidly and uniformly are mutually contradictory in practice, with the result that the temperature uniformity of heated thermoplastic removed from a contact oven in this way is unsatisfactory. A further problem is that the quenched surface leads to an increased visibility of the insert in the pressed component.

SUMMARY OF THE INVENTION

The object of the present invention is to eliminate the disadvantages of the known heating-up method. This is achieved according to the invention by using on the upper and lower sides of the fiber reinforced thermoplastics to be heated, in addition to the bands, sheet-like or filament-shaped restraining means, which are respectively arranged between the thermoplastic to be heated and the bands.

DESCRIPTION OF THE PREFERRED EMBODIMENT

Accordingly, the invention concerns a method for heating fiber reinforced thermoplastics in sheet form in contact heating means, in which the thermoplastic is heated between bands in the space between two heating means which can be pressed against it, wherein the thermoplastic is held between an upper and a lower sheet-like or filament-shaped restraining means, which is respectively arranged between the thermoplastic and the band, after heating up, the thermoplastic is taken out of the heating zone of the contact heating means together with the restraining means and bands, the bands firstly being detached from the thermoplastic, while the restraining means continue to bear against the thermoplastic, and subsequently the restraining means are detached from the thermoplastic.

Once the fiber reinforced thermoplastic has been heated, firstly the contact pressure of the heating plates is removed, the gap between the heating plates is possibly also enlarged, subsequently the bands, restraining means and heated fiber reinforced thermoplastic are together taken out of the heating zone by movement in the plane of the thermoplastic, once outside the heating zone the two bands first of all being removed from the plane of movement by deflecting around a roller or roll or some other suitable means and thereby being detached from the heated fiber reinforced thermoplastic, which for its part is kept in the plane of movement by the restraining means. Subsequently, the restraining means are deflected out of the plane of movement and thereby detached from the fiber reinforced thermoplastic. The deflection is preferably performed sharply, that is to say about a small radius. Depending on the behavior of the fiber reinforced thermoplastic, this detachment may be assisted, if appropriate, by detaching aids which act on the thermoplastic through the plane of the restraining means at the points at which the restraining means are not touching the thermoplastic. The detachment of the restraining means may take place simultaneously, that is to say in geometrical terms at the same point in the horizontal direction or, as represented in FIG. 1, one after the other. In FIG. 1, the detachment of the upper restraining means (2) takes place first, in the region of the detachment point (9), and then the detachment of the lower restraining means (12) in the removal region (19) of the heated thermoplastic, by removal of the thermoplastic.

The restraining means rest flat on the upper side and lower side of the thermoplastic and preferably comprise groups of adjacent wires, strands, filaments or ribbons, which are oriented in the same direction as that in which the thermoplastic is taken out of the heating zone after heating, as long as they are bearing against the thermoplastic. In addition, restraining means comprising nets, grids, perforated plates or perforated films or foils are possible. They consist, for example, of metals, such as for example steel, copper, nickel or bronze, or of thermoset or thermoplastic polymers, such as for example urea, melamine or phenolic resins, epoxys, polypropylene, polyamides, polyimides, polyesters, polyether ketones, polyester ketones, polysulfides, polysulfones or aramids. The restraining means may also consist of natural materials, such as for example cellulose. What matters is that the decomposition temperature of the natural or synthetic thermoset materials is at least 10° C. higher than the heating temperature of the thermoplastic to be heated, and that, in the case where restraining means made of thermoplastic materials are used, their melting point is at least 20° C. above the heating temperature of the thermoplastic to be heated.

The method according to the invention can be used for heating all fiber reinforced thermoplastics. Examples of thermoplastics are polyolefins, such as for example polyethylenes or polypropylenes, polyamides, polyimides, polyesters, PVC, polyether ketones, polyester ketones, polysulfides or polysulfones.

Possible reinforcing fibers are, for example, glass fibers, carbon fibers, aramid fibers, metal fibers, ceramic fibers or natural fibers, such as for example cellulose. The fibers may be in the form of either chopped or continuous fibers or bundles of fibers (rovings) and of mats, nonwoven, woven, laid or knitted fabrics.

The invention also concerns an apparatus for carrying out the method according to the invention, comprising an upper heating plate (5) and a lower heating plate (15), an upper band (4) and a lower band (14) with corresponding rolls (3, 7, 13, 16) for feeding and taking up the bands, wherein at the top and bottom there are respectively arranged between the thermoplastic (6) to be heated and the bands (4, 14) an upper restraining means (2) and a lower restraining means (12), which, after the heating up of the thermoplastic, are taken out of the heating zone between the heating plates (5, 15) together with said thermoplastic and the bands, and which hold the thermoplastic (6) back when the bands (4, 14) are being detached from it, and are subsequently likewise detached from the thermoplastic. In a preferred embodiment, the apparatus has a removal zone (19) for the heated thermoplastic, which is formed by the lower restraining means (12) in that the detachment point (9) of the upper restraining means (2) lies ahead of the detachment of the lower restraining means (12).

The apparatus according to the invention may be designed for example, as represented in FIG. 1, such that both the bands and the restraining means are conveyed from an unwinding position, designed for example in the form of a rotatable drum or roll, to a similarly designed winding-up position. It is also possible, however, to make both the restraining means and the bands endless. The unwinding and winding-up drums then become deflection drums, of which in each case at least one must be driven. If appropriate, further deflection rollers may be arranged between the winding-up drum and the unwinding drum, and optimization of the tension and running of the restraining means and bands may be ensured by tensioning and web-guiding means, such as are known from the prior art.

BRIEF DESCRIPTION OF THE DRAWING

To illustrate the invention, a preferred embodiment of the apparatus according to the invention is represented in longitudinal section in FIG. 1, in which: (1) denotes the unwinding drum for the upper restraining means (2), (3) denotes the unwinding drum for the upper band (4), (5) denotes the upper heating plate, (6) denotes the thermoplastic to be heated, (7) denotes the winding-up drum for the upper band, (8) denotes the winding-up drum for the upper restraining means, (9) denotes the detachment point of the upper restraining means, (10) denotes an upper detachment aid for the heated thermoplastic, (11) denotes the unwinding drum for the lower restraining means (12), (13) denotes the unwinding drum for the lower band (14), (15) denotes the lower heating plate, (16) denotes the winding-up drum for the lower band, (17) denotes a lower detachment aid for the heated fiber reinforced thermoplastic, (18) denotes the winding-up drum for the lower restraining means, (19) denotes the position for the removal of the heated product.

EXAMPLE

Figure 1:
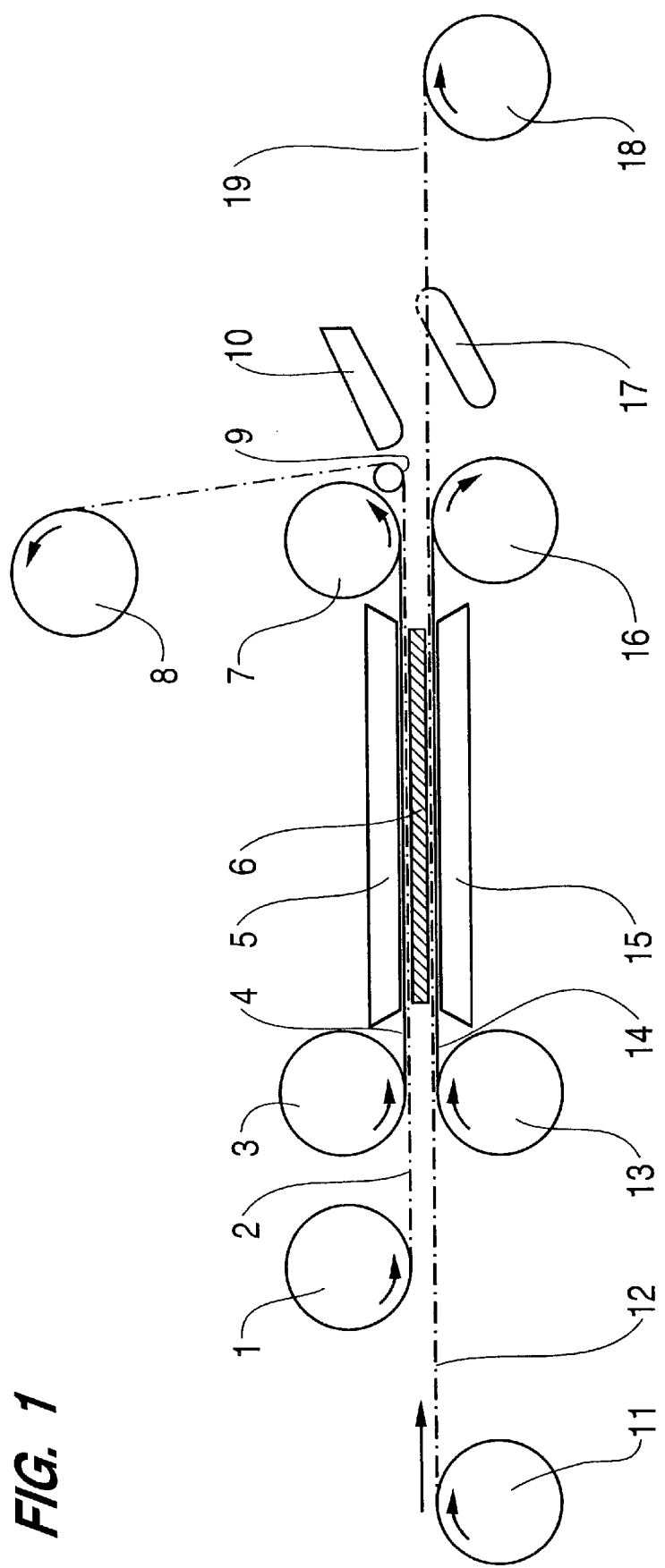

An apparatus as represented in FIG. 1, having the following dimensions, was used:
Diameter of the drums (1, 3, 7, 8, 11, 13, 16, 18): 50 mm
Bands (4, 14): PTFE-impregnated glass fabric, 0.13 mm thick
Restraining means (2, 12) : parallel steel wire cables 1 mm in diameter, pitch 12 mm
Heating plates (5, 15) 300 mm long (in the transporting direction), 200 mm wide, each 1.5 kW
Deflection radius of the upper restraining means (2) at the deflection point (9): 5 mm, no detachment aids (10, 17)
Fiber reinforced thermoplastic (6): glass fiber reinforced PP types TCF-30 P240 BS 200×300 mm, 4.1 mm thick (manufacturer: PCD Polymers)

The fiber reinforced thermoplastic introduced into the apparatus at room temperature was heated to 235° C. within 10 minutes with a heating power of 2×600 W. The pressing force of the upper heating plate was 200 N. After 10 minutes, the upper heating plate was lifted off and, by simultaneous rotation of the rolls (7, 8, 16, 18) in the direction of the arrow, the hot thermoplastic, the bands and restraining means were transported to the right (in FIG. 1) at a rate of about 2 m/minute. Both the two bands and the upper restraining means (group of steel cables) were detached without any residue from the thermoplastic, which could be taken off the lower restraining device (12), from the removal position (19), likewise without any residue.

What is claimed is:
1. A method for heating fiber reinforced thermoplastics in sheet form in contact heating means, in which the thermo- plastic is heated between bands in the space between two heating means which can be pressed against it, wherein the thermoplastic is held between an upper and a lower sheet or filament-shaped restraining means, which is respectively arranged between the thermoplastic and the band, after heating up, the thermoplastic is taken out of the heating zone of the contact heating means together with the restraining means and bands, the bands firstly being detached from the thermoplastic, while the restraining means continue to bear against the thermoplastic, and subsequently the restraining means are detached from the thermoplastic.

2. The method as claimed in claim 1, wherein the restraining means are groups of adjacent wires, strands, filaments or ribbons which are oriented in the same direction as that in which the thermoplastic is taken out of the heating zone after heating, as long as they are bearing against the thermoplastic.

3. The method as claimed in claim 1, wherein the restraining means are nets, grids, perforated plates or perforated films or foils.

4. The method as claimed in one of claim 1, wherein the restraining means consist of metallic materials.

5. The method as claimed in one of claim 1, wherein the restraining means consist of natural or synthetic thermoset materials, the decomposition temperature of which is at least 10 K higher than the heating temperature of the thermoplastic.

6. The method as claimed in one of claim 1, wherein the restraining means consist of thermoplastic materials, the melting point of which lies at least 20 K above the heating temperature of the thermoplastic.

7. The method as claimed in one of claim 1, wherein the restraining means are detached from the thermoplastic one after the other.

8. The method as claimed in one of claim 1, wherein the restraining means are detached from the thermoplastic simultaneously.

9. An apparatus for heating fiber reinforced thermoplastics in sheet form in contact heating means, in which the thermoplastic is heated in bands in the space between two heating means which can be pressed against it, said apparatus comprising an upper heating plate and a lower heating plate, an upper band and a lower band with corresponding rolls for feeding and taking up the bands, wherein at the top and bottom there are respectively arranged between the thermoplastic to be heated and the bands an upper restraining means and a lower restraining means, which, after the heating up of the thermoplastic, are taken out of the heating zone between the heating plates together with said thermoplastic and the bands, and which hold the thermoplastic back when the bands are being detached from it, and are subsequently likewise detached from the thermoplastic.

10. The apparatus as claimed in claim 9, wherein the lower restraining means forms a removal zone for the heated thermoplastic after the detachment point of the upper restraining means.

* * * * *

UNITED STATES PATENT AND TRADEMARK OFFICE
CERTIFICATE OF CORRECTION

PATENT NO. : 5,942,180
DATED : August 24, 1999
INVENTOR(S) : Ernst ZOPF et al.

It is certified that error appears in the above-identified patent and that said Letters Patent is hereby corrected as shown below:

Claim 4, line 1, delete "one of".
Claim 5, line 1, delete "one of".
Claim 6, line 1, delete "one of".
Claim 7, line 1, delete "one of".
Claim 8, line 1, delete "one of".

Signed and Sealed this

Twenty-ninth Day of February, 2000

Attest:

Q. TODD DICKINSON

Attesting Officer

Commissioner of Patents and Trademarks